(12) United States Patent
Pitchford

(10) Patent No.: US 10,020,672 B2
(45) Date of Patent: Jul. 10, 2018

(54) ENHANCED WIRELESS POWER CHARGING SYSTEM

(71) Applicant: Donte Pitchford, Snellville, GA (US)

(72) Inventor: Donte Pitchford, Snellville, GA (US)

( * ) Notice: Subject to any disclaimer, the term of this patent is extended or adjusted under 35 U.S.C. 154(b) by 112 days.

(21) Appl. No.: 15/263,402

(22) Filed: Sep. 13, 2016

(65) Prior Publication Data

US 2017/0264129 A1   Sep. 14, 2017

Related U.S. Application Data

(60) Provisional application No. 62/305,676, filed on Mar. 9, 2016.

(51) Int. Cl.
| | | |
|---|---|---|
| *H02J 7/00* | (2006.01) | |
| *H02J 7/02* | (2016.01) | |
| *H02J 50/10* | (2016.01) | |

(52) U.S. Cl.
CPC ............ *H02J 7/025* (2013.01); *H02J 7/0044* (2013.01); *H02J 7/0052* (2013.01); *H02J 50/10* (2016.02); *H02J 7/0047* (2013.01); *H02J 2007/0062* (2013.01)

(58) Field of Classification Search
CPC ...................................... H02J 7/025
USPC ......................................... 320/108
See application file for complete search history.

(56) References Cited

U.S. PATENT DOCUMENTS

| | | | | |
|---|---|---|---|---|
| 2011/0012555 A1* | 1/2011 | Jensen | ................... | H02J 7/0044 320/107 |
| 2014/0152235 A1* | 6/2014 | Huang | ................... | G06F 1/1632 320/107 |
| 2015/0015192 A1* | 1/2015 | Leabman | ................ | H02J 7/025 320/108 |
| 2016/0006291 A1* | 1/2016 | Li | ........................... | H02J 7/025 320/108 |
| 2016/0020637 A1* | 1/2016 | Khlat | ...................... | H02J 7/025 320/108 |
| 2016/0087486 A1* | 3/2016 | Pogorelik | ............... | H02J 7/025 320/108 |

* cited by examiner

*Primary Examiner* — Suresh Memula
(74) *Attorney, Agent, or Firm* — Mack N. Haynes

(57) ABSTRACT

A network of participating geographically diverse organizations or locations that offer a bluetooth/wifi aggregated enhanced wireless charging system to charge personal digital assistants is provided. The enhanced wireless charging system includes a bluetooth charging outlet device that charges the personal digital assistant, and a bluetooth charging USB plug-in device. The bluetooth charging outlet device includes a function button that turns the bluetooth charging outlet device ON or OFF, ventilation slots that maintains air flow in the bluetooth charging outlet device to avoid overhearing The bluetooth charging USB plug-in device is coupled with the personal digital assistant. The bluetooth charging USB plug-in device includes a USB that connects the bluetooth charging USB plug-in device to the personal digital assistant, a function button that turns the bluetooth charging USB plug-in device ON or OFF, a USB charging port that charges the bluetooth charging USB plug-in device, and a Velcro that couples the bluetooth charging USB plug-in device to the personal digital assistant.

12 Claims, 6 Drawing Sheets

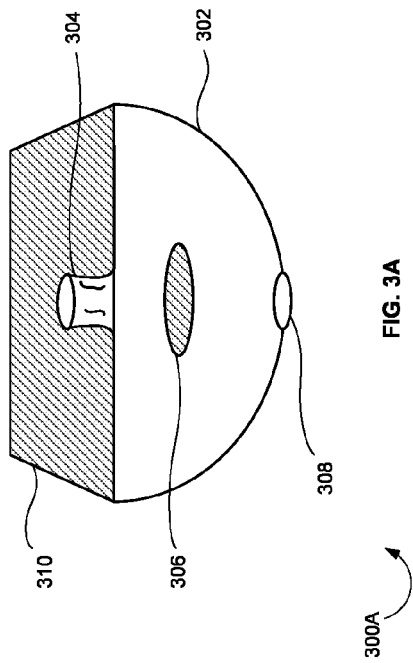
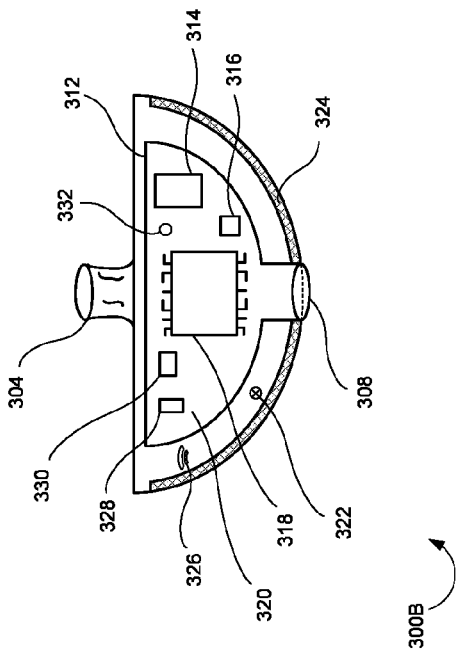
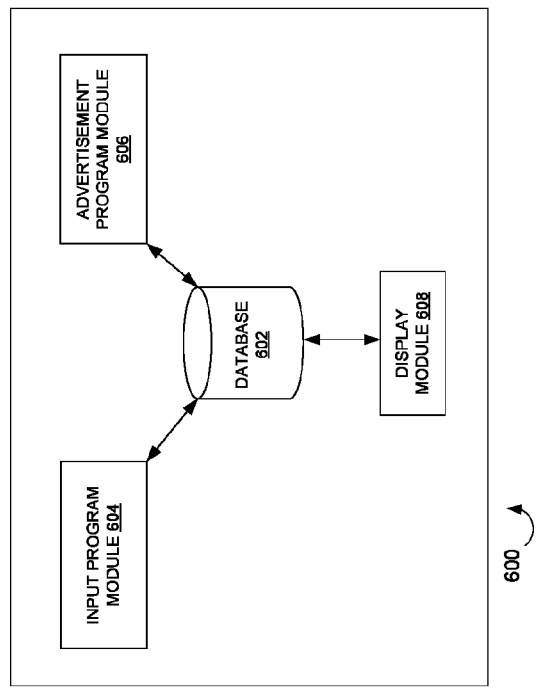

ENHANCED WIRELESS POWER CHARGING SYSTEM

CROSS REFERENCE TO THE RELATED APPLICATION

This application claims priority to and the benefits of the provisional patent application No. "62/305,676" titled "Network Bluetooth Charging System and Enhanced Bluetooth Charging Device" filed in United States Patent and Trademark Office on "Mar. 9, 2016". The specification of the above referenced patent application is incorporated herein by reference in its entirety

BACKGROUND

Technical Field

Today is the time when a user carries the whole world in their hands, more specifically, in a personal digital assistant (PDA). The personal digital assistant may be a phone, a tablet, a personal computer, a laptop, or the like. The user accesses the whole world using the personal digital assistant (PDA). But at the same time, the PDA consumes a large amount of power from the PDA's battery. The user needs to connect the PDA to the charger very frequently due to continuous usage of the PDA. Conventional chargers incorporate a wire connection to an adapter that charges the PDA. In today's busy schedule, the user needs to be mobile every time. But the conventional chargers limit the mobility of the user.

Consequently, there remains a need for a wireless charging device and renewable energy system that allows the user to move to different places with the PDA when the PDA is always kept on charging.

SUMMARY OF THE INVENTION

In view of the foregoing, an embodiment herein provides an enhanced wireless charging system to charge one or more personal digital assistant(s). The enhanced wireless charging system includes a bluetooth charging outlet device that charges the one or more personal digital assistant. The bluetooth charging outlet device includes (i) a function button, (ii) a light indicator, and (iii) one or more ventilation slots. One of the capabilities of the function button is to illustrate whether the device is ON or OFF. The light indicator indicates functionality of the bluetooth charging outlet device. The one or more ventilation slots maintain air flow in the bluetooth charging outlet device and avoid overheating of the bluetooth charging outlet device. The enhanced wireless charging system further includes a bluetooth charging USB plug-in device that couples with the one or more personal digital assistant. The bluetooth charging USB plug-in device includes (i) a USB, (ii) a function button, (iii) a USB charging port, (iv) a Velcro, (v) a memory stick, and (vi) a rechargeable battery. The USB connects the bluetooth charging USB plug-in device to the one or more personal digital assistant. The function button turns the bluetooth charging USB plug-in device ON or OFF. The USB charging port charges the bluetooth charging USB plug-in device. The Velcro couples the bluetooth charging USB plug-in device to the one or more personal digital assistant. The memory stick stores daily administration data. The rechargeable battery runs the bluetooth charging USB plug-in device.

The enhanced wireless charging system includes the operations management platform that must be remotely managed and maintain a communication channel between the individual devices and the backend platform to facilitate service operations. It further includes a processor that includes a database, and a set of modules. The processor executes the set of modules. The set of modules includes (i) an input program module, (ii) an advertisement program module, and (iii) a display program module. The input program module is configured to receive an input from the bluetooth charging USB plug-in device. The input is a plurality of advertisements from the database. The advertisement program module configured to advertise the advertisement on the one or more personal digital assistant. The display program module configured to display the advertisement on the one or more personal digital assistant.

The functionality of the light indicator is that (i) when said light indicator flashes blue or green color, said bluetooth charging outlet device is charging said personal digital assistant, and (ii) when said light indicator turns red, said bluetooth charging outlet device shows an error. According to an embodiment, the bluetooth charging outlet device is a (i) wall emitter, (ii) rod emitter, or (iii) pad emitter.

The wall emitter includes (i) a pair of electric plugs, (ii) a function button, (iii) a light indicator, (iv) one or more ventilation slots, (v) a space, and (vi) a reset button. The pair of electric plugs get plugged into an electrical outlet. The function button allows a user to turn the wall emitter ON or OFF. The light indicator indicates a functionality of the wall emitter. One of the functions of the light indicator is that when the light indicator shows blue or green flashing light, the bluetooth charging outlet device is charging the personal digital assistant. Once the personal digital assistant is fully charged, the flashing blue or green light goes steady blue or green. In case of an error, the light indicator turns red. In one embodiment, the light indicator turns yellow in ready-to-charge condition of the personal digital assistant. The one or more ventilation slots prevent the wall emitter from overheating. The space is provided for sectioning of internal hardware of the wall emitter. The reset button function resets the wall emitter to begin normal charging capabilities when the user presses the reset button.

In another aspect, a rod emitter is provided that includes a motherboard that further includes (i) a bluetooth charging coil, (ii) a protocol chip, (iii) an interface chip, and (iv) a bluetooth charging chip. The bluetooth charging coil emits a bluetooth/wifi aggregated charging signal. The protocol chip/operations management platform oversees daily administration of the personal digital assistant and all protocol system operations. The interface chip administrates program codes that allow the rod emitter to communicate with a bluetooth charging USB plug-in device. The bluetooth charging chip activates the bluetooth charging coil. The enhanced wireless charging system includes the devices that are the Internet of Things. The devices are remotely managed and maintain a communication channel between the individual devices and the backend platform to facilitate service operations.

The rod emitter may include (i) one or more bulb emitters, (ii) an extension rod, (iii) a light indicator, and (iv) one or more ventilation slots. The one or more bulb emitters emit a wide range of the bluetooth charging signal. The extension rod connects the rod emitter in different vertical or horizontal vantage points on a ceiling to suspend the rod emitter in an overhead vantage point. The light indicator indicates the functionality of the rod emitter. The one or more ventilation slots prevent the rod emitter from overheating.

In another aspect, a pad emitter is provided that includes (i) a pad, and (ii) a power cord. The pad employs one or more coils that emit the one or more bluetooth signals to charge the personal digital assistant. The pad may be interconnected among multiple pads and be customized to fit a surface, including without limiting, an armrest, a table or a wall. The power cord is attached to the pad at one end and coupled to an electrical plug at other end. The electrical plug gets plugged into a wall outlet to provide power supply to the pad emitter.

In another aspect, the bluetooth charging USB plug-in device further includes a motherboard that includes (i) a protocol chip, (ii) an interface chip, (iii) a bluetooth charging chip, and (iv) an update space. The protocol chip oversees daily administration of the bluetooth charging USB plug-in device and all protocol system operations. The interface chip administrates program codes that allow the Bluetooth charging outlet device to communicate with the bluetooth charging USB plug-in device. The bluetooth charging chip activates the bluetooth coil that receives the Bluetooth charging signal from the (i) wall emitter, (ii) rod emitter or (iii) pad emitter.

The bluetooth charging USB plug-in device further includes (i) an update space, (ii) a light indicator, and (iii) protective insulation. The update space allows up-gradation of the bluetooth charging USB plug-in device with new integration technology. The light indicator shows status of the bluetooth charging USB plug-in device. The protective insulation is made of foam and protects the motherboard, the protocol chip, the interface chip and the bluetooth charging chip. The one or more ventilation slots prevent the bluetooth charging USB plug-in device from overheating.

In yet another aspect, an enhanced wireless power charging system to charge one or more personal digital assistant is provided. The enhanced wireless power charging system includes a rod emitter to charge the one or more personal digital assistant. The rod emitter includes a hardware motherboard. The hardware motherboard includes (i) a bluetooth charging coil, (ii) a protocol chip, (iii) an interface chip, and (iv) a bluetooth charging chip. The bluetooth charging coil emits a bluetooth charging signal. The protocol chip oversees daily administration of the personal digital assistant and all protocol system operations, including the battery status of the personal digital assistant and the connectivity status of the personal digital assistant to the rod emitter or the wall emitter. The interface chip administrates program codes that allow the rod emitter to communicate with a bluetooth charging USB plug-in device. The bluetooth charging chip activates the bluetooth charging coil. The rod emitter further includes (i) one or more bulb emitters, (ii) an extension rod, (iii) a light indicator, (iv) one or more ventilation slots. The one or more bulb emitters emit a wide range of the bluetooth charging signal. The extension rod connects the rod emitter in different vertical or horizontal vantage points on a ceiling to suspend the rod emitter in an overhead vantage point. The light indicator indicates the functionality of the rod emitter. The one or more ventilation slots prevent the rod emitter from overheating The enhanced wireless power charging system further includes a bluetooth charging USB plug-in device that couples with the one or more personal digital assistant. The bluetooth charging USB plug-in device includes (i) a USB, (ii) a function button, (iii) a USB charging port, and (iv) a velcro. The USB connects the bluetooth charging USB plug-in device to the one or more personal digital assistant. The function button turns the bluetooth charging USB plug-in device ON or OFF. The USB charging port charges the bluetooth charging USB plug-in device.

The enhanced wireless power charging system further includes (i) a motherboard, and (ii) a processor. The motherboard includes (i) a microcontroller, (ii) a protocol chip, (iii) an interface chip (iv) a bluetooth charging chip, (v) an update space, and (vi) a receiving antenna. The microcontroller controls the protocol chip, the interface chip and the Bluetooth charging chip. The protocol chip oversees daily administration of the bluetooth charging USB plug-in device and all protocol system operations. The interface chip administrates program codes that allow the Bluetooth charging outlet device to communicate with the bluetooth charging USB plug-in device. The bluetooth charging chip activates the bluetooth coil that receives the Bluetooth charging signal from the (i) wall emitter, (ii) rod emitter or (iii) pad emitter. The update space allows up-gradation of the bluetooth charging USB plug-in device with new integration technology. The processor includes a database, and a set of modules. The processor executes the set of modules. The set of modules includes an input program module, an advertisement program module, and a display program module. The input program module is configured to receive an input from the bluetooth charging USB plug-in device. The input is a plurality of advertisements from the database. The advertisement program module is configured to advertise the advertisement on the one or more personal digital assistant. The display program module is configured to display the advertisement on the one or more personal digital assistant. The receiving antenna receives the Bluetooth charging signal to charge the one or more personal digital assistant.

The wall emitter includes (i) a pair of electric plugs, (ii) a function button, (iii) a light indicator, (iv) one or more ventilation slots, (v) a space, and (vi) a reset button. The pair of electric plugs get plugged into an electrical outlet. The function button allows a user to turn the wall emitter ON or OFF. The light indicator indicates a functionality of the wall emitter. One of the functions of the light indicator is that when the light indicator shows blue or green flashing light, the bluetooth charging outlet device is charging the personal digital assistant. Once the personal digital assistant is fully charged, the flashing blue or green light goes steady blue or green. In case of an error, the light indicator turns red. In one embodiment, the light indicator turns yellow in ready-to-charge condition of the personal digital assistant. The one or more ventilation slots prevent the wall emitter from overheating. The space is provided for sectioning of internal hardware of the wall emitter. The reset button resets the wall emitter to begin normal charging capabilities when the user presses the reset button.

The pad emitter includes (i) a pad, and (ii) a power cord. The pad employs one or more coils that emit the one or more bluetooth signals to charge the personal digital assistant. The power cord is attached to the pad at one end and coupled to an electrical plug at other end. The electrical plug gets plugged into a wall outlet to provide power supply to the pad emitter. The enhanced wireless charging system includes the devices, including pad emitter, that are the Internet of Things. The devices are remotely managed and maintain a communication channel between the individual devices and the backend platform to facilitate service operations. In one embodiment, the pad may be interconnected among multiple pads and be customized to fit a surface, including without limiting, an armrest, a table or a wall.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3A is a perspective view of a bluetooth charging USB plug-in device of the enhanced wireless charging system to charge the personal digital assistant (PDA) according to an embodiment herein;

FIG. 3B is a cross sectional view of the bluetooth charging USB plug-in device of the enhanced wireless charging system to charge the personal digital assistant (PDA) according to an embodiment herein;

FIG. 6 illustrates an exploded view of an advertisement application of the enhanced wireless charging system of FIG. 5 according to an embodiment herein;

DETAILED DESCRIPTION OF PREFERRED EMBODIMENTS

Figure 1A:
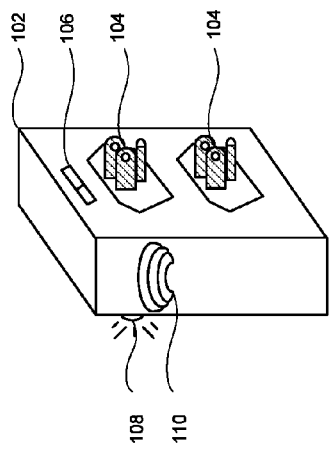
FIG. 1A is a perspective view of a bluetooth charging outlet device of an enhanced wireless charging system to charge a personal digital assistant (PDA) according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for simple and inexpensive yet highly reliable wireless charging device and system. The embodiments herein achieve this by providing a bluetooth charging outlet device that charges a personal digital assistant (PDA). Referring now to the drawings, and more particularly to FIGS. 1A through 8, where similar reference characters denote corresponding features consistently throughout the figures, there are shown preferred embodiments.

FIG. 1A is a perspective view of a bluetooth charging outlet device 102 of an enhanced wireless charging system to charge a personal digital assistant (PDA) according to an embodiment herein. The bluetooth charging outlet device 102 acts as an emitter to emit bluetooth signals to charge the personal digital assistant (PDA). The bluetooth charging outlet device 102 includes a pair of electrical plugs 104, a function button 106, a light indicator 108, and one or more ventilation slots 110. The bluetooth charging outlet device 102 gets power from the pair of electrical plugs 104. In one embodiment, the pair of electrical plugs 104 may include two or more prongs without being limited to standard electrical outlets. In another embodiment, the prongs may be customized to fit any electrical outlet. The function button 106 turns the bluetooth charging outlet device 102 ON and OFF. Additionally, the function button 106 allows a user to turn the bluetooth charging outlet device 102 ON and/or OFF.

The light indicator 108 illuminates lights in blue and green colors, and indicates the functionality of the Bluetooth charging outlet device 102. Flashing blue or green color indication in the light indicator 108 represents that the bluetooth charging outlet device 102 is charging the personal digital assistant (PDA). Once the personal digital assistant is fully charged, the flashing blue or green light goes steady blue or green. In case of an error, the light indicator turns red. In one embodiment, the light indicator turns yellow in ready-to-charge condition of the personal digital assistant. The one or more ventilation slots 110 are provided in the bluetooth charging outlet device 102 to keep the bluetooth charging outlet device 102 cool from overheating. The one or more ventilation slots 110 keeps the moisture out by enhancing air circulation inside the bluetooth charging outlet device 102.

Figure 1B:
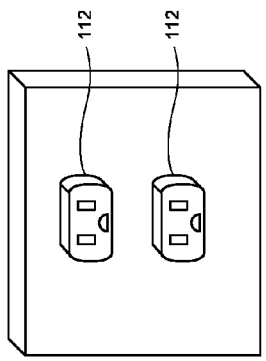
FIG. 1B illustrates a wall to connect the bluetooth charging outlet device of the enhanced wireless charging system according to an embodiment herein.

FIG. 1B illustrates a wall with electrical sockets to connect the bluetooth charging outlet device 102 of the enhanced wireless charging system according to an embodiment herein. The wall carries a pair of electrical socket 112. The pair of electrical plugs 104 is adapted to be plugged into the pair of electrical socket 112.

Figure 1C:
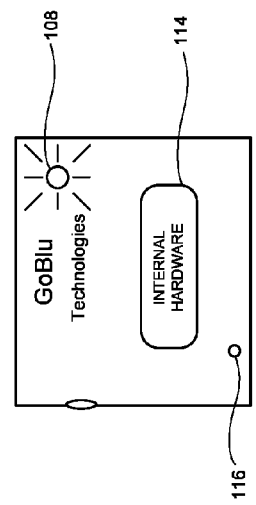
FIG. 1C is a front view of the bluetooth charging outlet device of the enhanced wireless charging system according to an embodiment herein.

FIG. 1C is a front view of the bluetooth charging outlet device 102 of the enhanced wireless charging system according to an embodiment herein. The bluetooth charging outlet device 102 further includes a space 114 and a reset button 116. The space 114 is provided for sectioning of the motherboard and internal hardware of the bluetooth charging outlet device 102. The reset button 116 resets the bluetooth charging outlet device 102 to begin the normal charging capabilities when the user presses the reset button 116 and holds with a needle point.

Figure 1D:
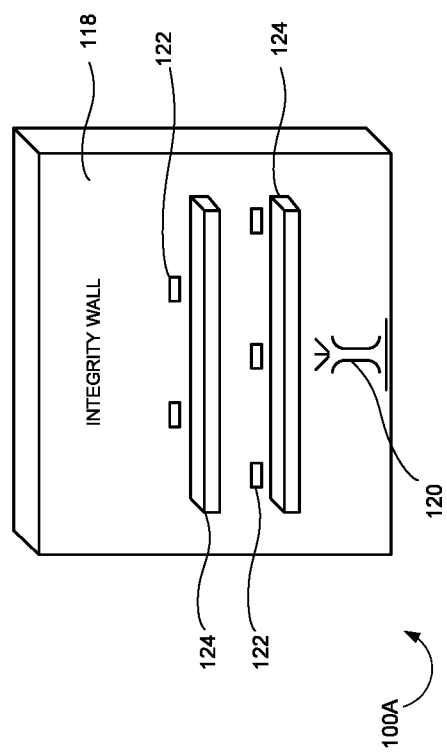
FIG. 1D is a perspective view of an integrity wall emitter of the enhanced wireless charging system to charge the personal digital assistant (PDA) according to an embodiment herein.

FIG. 1D is a perspective view of an integrity wall emitter 100A of the enhanced wireless charging system to charge the personal digital assistant (PDA) according to an embodiment herein. The wall emitter includes the wall 118, a power source 120, one or more emitters 122 and one or more landing platforms 124. The wall 118 includes one or more sponsors. The power source 120 is embedded in the wall 118 and supplies power to the one or more emitters 122. The one or more emitters 122 are strategically embedded in the wall 118. The user stands and holds the personal digital assistant near by the wall 118 to receive the Bluetooth charge from the bluetooth charging outlet device 102 to charge the personal digital assistant (PDA). The one or more landing platforms 124 are adapted to hold the personal digital assistant (PDA).

Figure 2A:
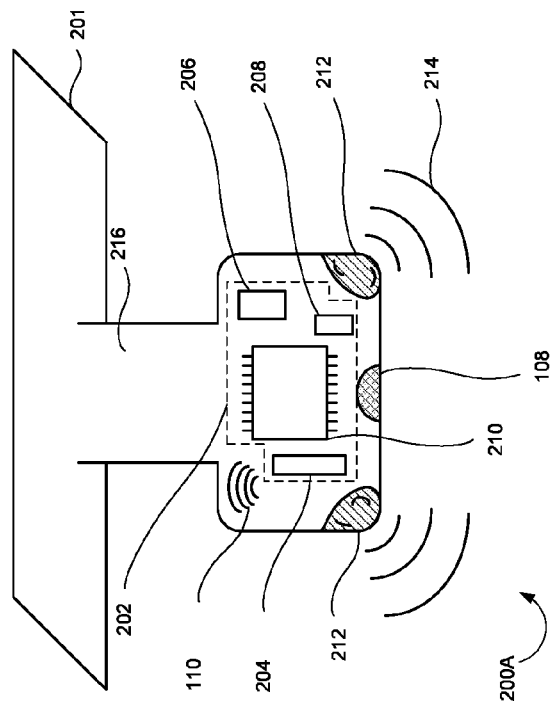
FIG. 2A is a perspective view of a rod emitter of the enhanced wireless charging system to charge the personal digital assistant (PDA) according to an embodiment herein.

FIG. 2A is a perspective view of a rod emitter 200A of the enhanced wireless charging system to charge the personal digital assistant (PDA) according to an embodiment herein. The rod emitter 200A includes a ceiling 201, a hardware motherboard 202, one or more bulb emitters 212, bluetooth charging signals 214, an extension rod 216, the light indicator 108, and the one or more ventilation slots 110. The rod emitter 200A couples to the ceiling 201. The hardware motherboard 202 includes a bluetooth charging coil 204, a protocol chip 206, an interface chip 208 and a bluetooth charging chip 210. The bluetooth charging coil 204 emits the enhanced bluetooth/wifi aggregated charging signal 214. AUSB charging device coil (not shown in the FIG. 2A) receives the bluetooth charging signal 214 to charge the personal digital assistant (PDA). The protocol chip 206 oversees the daily administration of the personal digital assistant (PDA)and all the protocols system operations. The protocol chip 206 supervises the battery level/status of the personal digital assistant and the connectivity status of the personal digital assistant to the rod emitter or the wall emitter.

The interface chip 208 administrates program codes that allow the Bluetooth charging outlet device 102 to communicate with a bluetooth charging USB plug-in device 302. The interface chip 208 controls a new Wi-Fi and/or Bluetooth integration process with the Bluetooth charging outlet device 102 at distances 1 cm to 30 feet or more. The interface chip 208 controls the bluetooth charging signals 214 in the Bluetooth charging coil 204 of the Bluetooth charging outlet device 102. The interface chip 208 controls start and stopping of charging of the personal digital assistant (PDA) using the bluetooth charging signals 214.

The bluetooth charging chip 210 is a centerpiece of the technology used in the enhanced wireless charging system. The bluetooth charging chip 210 is placed on the hardware motherboard 202 strategically and functions to activate the bluetooth charging coil 204. In one embodiment, the bluetooth charging chip 210 is a Bluetooth/wifi aggregated integration chip. The one or more bulb emitters 212 emit a wide range of the bluetooth charging signal 214. In one embodiment, the one or more bulb emitters 212 send the bluetooth charging signal 214 focused to a particular area. In another embodiment, the one or more bulb emitters 212 are one or more transmitting antennae. The extension rod 216 connects to the rod emitter in different vertical or horizontal vantage points on a ceiling to suspend the rod emitter in an overhead vantage point. In one embodiment, the rod emitter stands from the ground with the rod to charge the personal digital assistant outdoors. A microcontroller (not shown in FIG. 2A) controls the protocol chip 206, the interface chip 208 and the Bluetooth charging chip 210.

Figure 2B:
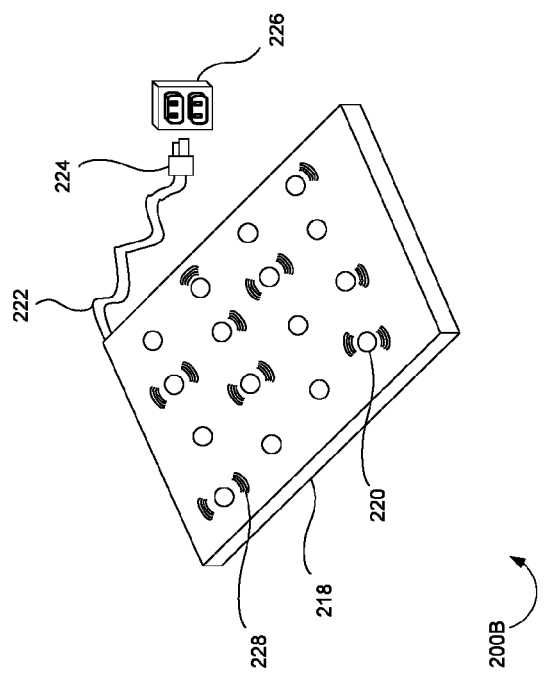
FIG. 2B is a perspective view of a pad emitter to charge the personal digital assistant (PDA) according to an embodiment herein.

FIG. 2B is a perspective view of a pad emitter 200B to charge the personal digital assistant (PDA) according to an embodiment herein. The pad emitter 200B includes a pad 218, one or more coils 220, a power cord 222, an electrical plug 224, a wall outlet 226, and one or more bluetooth signals 228. The pad 218 employs one or more coils 220 that are configured to emit the one or more bluetooth signals 614 to charge the personal digital assistant (PDA). In one embodiment, the one or more coils 220 may be one or more transmitting antennae. The power cord 222 is attached to the pad 218 at one end and couples the electrical plug 224 at the other end. The electrical plug is adapted to get plugged into the wall outlet 226 to provide power supply to the pad emitter 200B.

FIG. 3A is a perspective view 300A of a bluetooth charging USB plug-in device 302 of the enhanced wireless charging system to charge the personal digital assistant (PDA) according to an embodiment herein. The bluetooth charging USB plug-in device 302 includes a USB 304, a function button 306, a USB charging port 308, and a velcro 310. The USB 304 couples the bluetooth charging USB plug-in device 302 to the personal digital assistant (PDA) or PDA accessory like, a bluetooth ear piece, or the like. The function button 306 turns the bluetooth charging USB plug-in device 302 ON and/or OFF. The USB charging port 308 is provided to charge the bluetooth charging USB plug-in device 302. The velcro 310 is provided to couple the bluetooth charging USB plug-in device 302 to the personal digital assistant (PDA). In one embodiment, the velcro 310 can be replaced by snap on buttons or adhesive strips.

FIG. 3B is a cross sectional view 300B of the bluetooth charging USB plug-in device 302 of the enhanced wireless charging system to charge the personal digital assistant (PDA) according to an embodiment herein. The bluetooth charging USB plug-in device 302 further includes a motherboard 312, a light indicator 322, a protective insulation 324, one or more ventilation slots 326, a memory stick 328, a rechargeable battery 330, and a receiving antenna 332. The motherboard 312 includes a protocol chip 314, an interface chip 316, a bluetooth charging chip 318, and an update space 320. The protocol chip 314 oversees the daily administration of the bluetooth charging USB plug-in device 302 and all the protocols system operations.

The interface chip 316 administrates program codes that allow the Bluetooth charging outlet device 102 to communicate with a bluetooth charging USB plug-in device 302. The interface chip 208 controls a new Wi-Fi and/or Bluetooth integration process with the Bluetooth charging outlet device 102 at distances 1 cm to 30 feet or more. The interface chip 208 controls the bluetooth charging signals 214 in the Bluetooth charging coil 204 of the Bluetooth charging outlet device 102. The interface chip 208 controls the starting and stopping of charging of the personal digital assistant (PDA) using the bluetooth charging signals 214.

The bluetooth charging chip 318 is a center piece of the technology used in the bluetooth charging USB plug-in device 302. The bluetooth charging chip 318 is placed on the motherboard 312 strategically and activates the coil that receives the Bluetooth signal from the wall emitter 100A, the rod emitter 200A, or the pad emitter 200B. The update space 320 on the motherboard 312 allows the up-gradation of the Bluetooth charging USB plug-in device 302 with new integration technology. The update space 320 is exclusively left open for upgrades to the Bluetooth charging USB plug-in device 302 and unseen protocol additions. Flashing blue or green color indication in the light indicator 108 represents that the bluetooth charging outlet device 102 is charging the personal digital assistant (PDA). Once the personal digital assistant is fully charged, the flashing blue or green light goes steady blue or green. In case of an error, the light indicator turns red. In one embodiment, the light indicator turns yellow in ready-to-charge condition of the personal digital assistant. The dark ring at the outer surface of the Bluetooth charging USB plug-in device 302 is the protective insulation 324 made of foam. The protective insulation 324 is lightweight and protects the motherboard 312, the protocol chip 314, the interface chip 316, and the bluetooth charging chip 318 from shock that results from dropping of the Bluetooth charging USB plug-in device 302. The one or more ventilation slots 326 stop overheating of the Bluetooth charging USB plug-in device 302 and enhance the air flow to lower the temperature of the Bluetooth charging USB plug-in device 302. The memory stick 328 stores the daily administration data. The rechargeable battery 330 of the bluetooth charging USB plug-in device 302 stores power to sync the personal digital assistant to the emitters. The receiving antenna 332 receives the bluetooth charging signal and charges the personal digital assistant.

Figure 4:
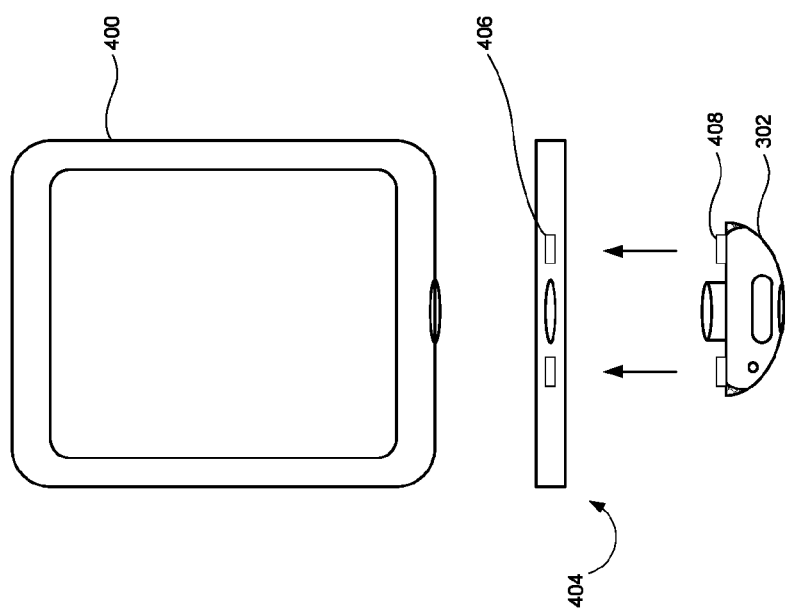
FIG. 4 illustrates a system view of the bluetooth charging USB plug-in device of the enhanced wireless charging system in a position to be coupled to the bluetooth charging USB plug-in device case according to an embodiment herein.

FIG. 4 illustrates a system view of the bluetooth charging USB plug-in device 302 of the enhanced wireless charging system in a position to be coupled to the bluetooth charging USB plug-in device case 400 according to an embodiment herein. In one embodiment, the design of the bluetooth charging USB plug-in device case 400 may be altered for any personal digital assistant (PDA). In another embodiment, the personal digital assistant (PDA) is, but not limited to, a smart phone, a tablet, a computer and/or a laptop. The bluetooth charging USB plug-in device 302 includes one or more connection holes 406 at the bottom. The bluetooth charging USB plug-in device 302 includes one or more connection lips 408 that are adapted to get inserted into the one or more connection holes 406. In one embodiment, the devices of the enhanced wireless charging system are the Internet of Things.

Figure 5:
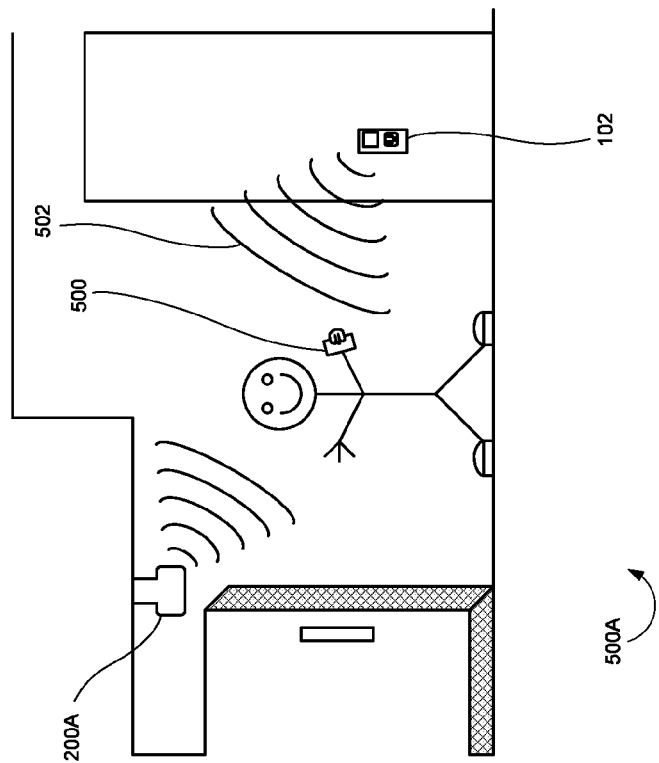
FIG. 5 illustrates an aerial view of a departmental store where the bluetooth charging outlet device and the rod emitter of the enhanced wireless charging system are installed to charge the personal digital assistant (PDA) according to an embodiment herein.

FIG. 5 illustrates an aerial view 500A of a departmental store where the bluetooth charging outlet device 102 and the rod emitter 200A of the enhanced wireless charging system are installed to charge the personal digital assistant (PDA) 500 according to an embodiment herein. In one embodiment, the departmental store may be replaced by a showroom, a restaurant, a club, or a fitness center. The bluetooth charging outlet device 102 and the rod emitter 200A emit the bluetooth signal 502. The user charges the personal digital assistant (PDA) 500 that the user carries while walking in the departmental store using the bluetooth charging outlet device 102 or the rod emitter 200A.

FIG. 6 illustrates an exploded view 600 of an advertisement application of the enhanced wireless charging system of FIG. 5 according to an embodiment herein. The exploded view 600 includes a database 602, an input program module 604, an advertisement program module 606, and a display program module 608. The input program module 604 receives an input from the bluetooth charging USB plug-in device 302. The input is a plurality of advertisements from the database 602. The advertisement program module 606 is configured to advertise the plurality of advertisements on the one or more personal digital assistant (PDA) 500. The display program module 608 is configured to display the advertisement on the one or more personal digital assistant (PDA) 500. In one embodiment, the user downloads the application while entering the departmental store, or the like, in the personal digital assistant 500. The application advertises the products of the departmental store that the user enters, and simultaneously charges the personal digital assistant 500. In another embodiment, the user downloads a no advertisement version of the application with a fee. In another embodiment, the personal digital assistant would not get charged until the user downloads the application.

Figure 7:
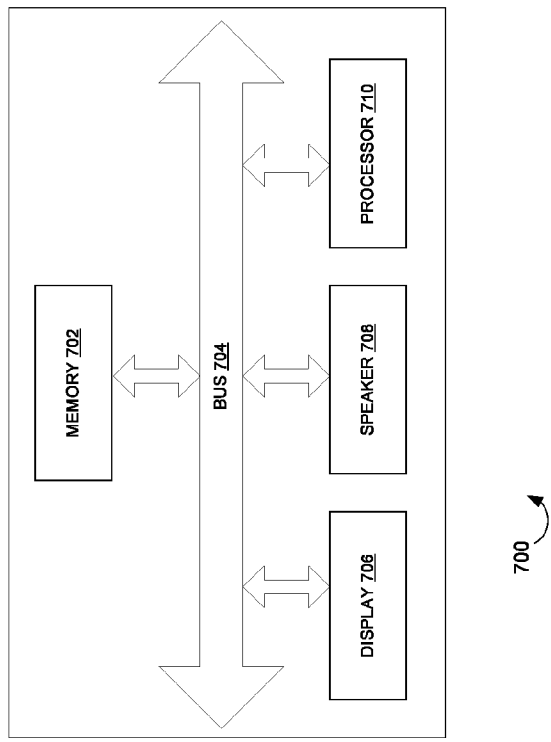
FIG. 7 illustrates an exploded view of the computing device according to an embodiment herein.

FIG. 7 illustrates an exploded view of the computing device having a memory 702 having a set of computer instructions, a bus 704, a display 706, a speaker 708, and a processor 710 capable of processing a set of instructions to perform any one or more of the methodologies herein, according to an embodiment herein. In one embodiment, the receiver may be the computing device. The processor 710 may also enable digital content to be consumed in the form of video for output via one or more displays 706 or audio for output via speaker and/or earphones 708. The processor 710 may also carry out the methods described herein and in accordance with the embodiments herein.

Digital content may also be stored in the memory 702 for future processing or consumption. The memory 702 may also store program specific information and/or service information (PSI/SI), including information about digital content (e.g., the detected information bits) available in the future or stored from the past. A user of the personal communication device may view this stored information on display 706 and select an item of for viewing, listening, or other uses via input, which may take the form of keypad, scroll, or other input device(s) or combinations thereof. When digital content is selected, the processor 710 may pass information. The content and PSI/SI may be passed among functions within the personal communication device using the bus 704.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A remote access data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
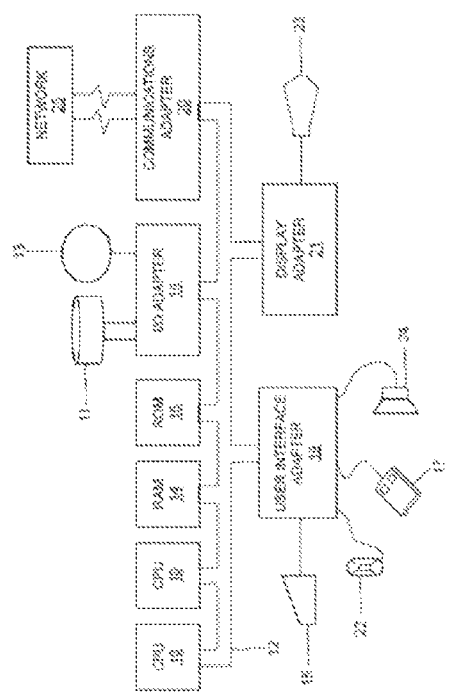
FIG. 8 depicts a representative hardware environment for practicing the embodiments herein.

A representative hardware environment for practicing the embodiments herein is depicted in FIG. 8. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input.

Additionally, a communication adapter 20 connects the bus 12 to a data processing network 25, and a display adapter 21 connects the bus 12 to a display device 23 which may be embodied as an output device such as a monitor, printer, or transmitter, for example The enhanced wireless power charging system is the new generation's charging technique. The user of today's life has become so much advanced that the user needs the personal digital assistant all the time. With enhanced wireless power charging system, the user needs not worry about the power consumption of the personal digital assistant. The user can charge the PDA wirelessly while conducting affairs in a participating organization; i.e. home, grocery store, airport, gym, coffee shop, or the like.) The enhanced wireless power charging system can also promote the products of the store or participating organization in which the user enters via the application; as well as rogue advertisements from participating businesses. The method and the system of this invention centers around the innovative concept of providing Bluetooth charging technology easier. So a person does not have to be stationary in their daily life when charging their devices. A person can be on the go from store to store, location to location in their regular daily life activities without having to worry about their phones or devices battery strength depleting. Also it will keep consumers in stores longer to be marketed so the consumer will be more likely to spend more money in that specific location, and driving up the locations sales. The longer they stay in the location spending the time to charge their device they are acknowledging the advertisements of products or services offered to continue the charge. Both the consumer is getting what they need as it concerns getting their device charged and the location is getting optimal advertising.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A network of participating geographically diverse organizations or locations that offer a bluetooth/wifi aggregated enhanced wireless charging system to charge one or more personal digital assistant, wherein said enhanced wireless charging system comprises:

a bluetooth charging outlet device that is adapted to charge said one or more personal digital assistant, wherein said bluetooth charging outlet device comprises:
a function button that is adapted to turn said bluetooth charging outlet device ON or OFF;
a light indicator that is adapted to indicate functionality of said bluetooth charging outlet device; and
one or more ventilation slots that are adapted to maintain air flow in said bluetooth charging outlet device and avoid overhearing of bluetooth charging outlet device;

a bluetooth charging USB plug-in device that is adapted to couple with said one or more personal digital assistant, wherein said bluetooth charging USB plug-in device comprises:
a USB that is adapted to connect said bluetooth charging USB plug-in device to said one or more personal digital assistant a function button that is adapted to turn said bluetooth charging USB plug-in device ON or OFF;

a USB charging port that is adapted to charge said bluetooth charging USB plug-in device; and a velcro that is adapted to couple said bluetooth charging USB plug-in device to said one or more personal digital assistant;

a memory stick wherein said memory stick is adapted to store daily administration data;

a rechargeable battery wherein said rechargeable battery is adapted to run said bluetooth charging USB plug-in device;

a receiving antenna wherein said receiving antenna is adapted to receive a bluetooth charging signal to charge said one or more personal digital assistant; and a processor that comprises a database, and a set of modules, wherein said processor executes said set of modules, wherein said set of module comprises:

an input program module, executed by said processor, that is configured to receive an input from said bluetooth charging USB plug-in device, wherein said input is a plurality of advertisements from said database;

an advertisement program module, executed by said processor that is configured to advertise said advertisement on said one or more personal digital assistant;

a display program module, executed by said processor that is configured to display said advertisement on said one or more personal digital assistant.

2. The enhanced wireless power charging system of claim 1, wherein said functionality is a indication of status of said bluetooth charging outlet device, wherein (i) when said light indicator flashes blue or green color, said bluetooth charging outlet device is charging said personal digital assistant, and (ii) when said light indicator turns red, said bluetooth charging outlet device shows an error.

3. The enhanced wireless power charging system of claim 1, wherein said bluetooth charging outlet device is a wall emitter.

4. The bluetooth charging outlet device of claim 3, wherein said wall emitter comprises:

a pair of electric plugs that are adapted to get plugged into an electrical outlet ;

a function button that is adapted to allow a user to turn said wall emitter ON or OFF;

a light indicator that is adapted to indicate a functionality of said wall or ceiling emitter, wherein said functionally is that (i) when said light indicator flashes blue or green color, said bluetooth charging outlet device is charging said personal digital assistant, and (ii) when said light indicator turns red, said bluetooth charging outlet device shows an error;

one or more ventilation slots that are adapted to prevent said wall emitter from overheating;

a space that is provided for sectioning of internal hardware of said wall emitter; and a reset button that is adapted to reset said wall emitter to begin normal charging capabilities when said user presses said reset button.

5. The bluetooth charging outlet device of claim 3, wherein said wall emitter comprises:

a pair of electric plugs that are adapted to get plugged into an electrical outlet ;

a function button that is adapted to allow a user to turn said wall emitter ON or OFF;

a light indicator that is adapted to indicate a functionality of said wall emitter, wherein said functionally is that (i) when said light indicator flashes blue or green color, said bluetooth charging outlet device is charging said personal digital assistant, and (ii) when said light indicator turns red, said bluetooth charging outlet device shows an error;

one or more ventilation slots that are adapted to prevent said wall emitter from overheating;

a space that is provided for sectioning of internal hardware of said wall emitter; and a reset button that is adapted to reset said wall emitter to begin normal charging capabilities when said user presses said reset button.

6. The enhanced wireless power charging system of claim 1, wherein said bluetooth charging outlet device is a rod emitter.

7. The bluetooth charging outlet device of claim 6, wherein said rod emitter comprises:

a motherboard wherein said motherboard further comprises:

a bluetooth charging coil that emits an enhanced bluetooth/wifi aggregated charging signal;

a protocol chip that is adapted to oversee daily administration of said personal digital assistant and all protocol system operations, wherein said protocol chip sees battery status of said personal digital assistant and connectivity status of said personal digital assistant to said rod emitter;

an interface chip that is adapted to administrate program codes that allow said rod emitter to communicate with a bluetooth charging USB plug-in device; and a bluetooth charging chip that is adapted to activate said bluetooth charging coil;

a microcontroller wherein said microcontroller is adapted to control said bluetooth charging chip, said protocol chip and said an interface chip;

one or more bulb emitters that are adapted to emit a wide range of said bluetooth charging signal;

an extension rod that is adapted to connect said rod emitter in different vertical or horizontal vantage points on a ceiling to suspend said rod emitter in an overhead vantage point.

a light indicator that is adapted to indicate functionality of said rod emitter; and one or more ventilation slots that are adapted to prevent said rod emitter from overheating.

8. The enhanced wireless power charging system of claim 1, wherein said bluetooth charging outlet device is a pad emitter.

9. The bluetooth charging outlet device of claim 8, wherein said pad emitter comprises:

a pad that is adapted to employ one or more coils that are configured to emit said one or more bluetooth signals to charge said personal digital assistant; and a power cord that is attached to said pad at one end and coupled to an electrical plug at other end, wherein said electrical plug is adapted to get plugged into a wall outlet to provide power supply to said pad emitter.

10. The bluetooth charging outlet device of claim 8, wherein said pad emitter comprises:

a pad that is adapted to employ one or more coils that are configured to emit said one or more bluetooth signals to charge said personal digital assistant; and a power cord that is attached to said pad at one end and coupled to an electrical plug at other end, wherein said electrical plug is adapted to get plugged into a wall outlet to provide power supply to said pad emitter.

11. The enhanced wireless power charging system of claim 1, wherein said bluetooth charging USB plug-in device further comprises a motherboard, wherein said motherboard comprises:
- a protocol chip that is configured to oversee daily administration of said bluetooth charging USB plug-in device and all protocol system operations;
- an interface chip that is configured to administrate program codes that allow said Bluetooth charging outlet device to communicate with said bluetooth charging USB plug-in device;
- a bluetooth charging chip is configured to activate said bluetooth coil that receives said Bluetooth charging signal from said (i) wall emitter, (ii) rod emitter, or (iii) pad emitter; and
- an update space is adapted to allow up-gradation of said bluetooth charging USB plug-in device with new integration technology;
- a light indicator that is adapted to show status of said bluetooth charging USB plug-in device;
- protective insulation that is adapted to protect said motherboard, said protocol chip, said interface chip and said bluetooth charging chip; and
- one or more ventilation slots that are adapted to prevent said bluetooth charging USB plug-in device from overheating.

12. An enhanced wireless power charging system to charge one or more personal digital assistant, wherein said enhanced wireless charging system comprises:
- a rod emitter that is adapted to charge said one or more personal digital assistant, wherein said rod emitter comprises:
  - a hardware motherboard wherein said motherboard hardware further comprises:
    - a bluetooth charging coil that emits an enhanced bluetooth/wifi aggregated charging signal;
    - a protocol chip that is adapted to oversee daily administration of said personal digital assistant and all protocol system operations;
    - an interface chip that is adapted to administrate program codes that allow said rod emitter to communicate with a bluetooth charging USB plug-in device; and
    - a bluetooth charging chip that is adapted to activate said bluetooth charging coil;
  - one or more bulb emitters that are adapted to emit a wide range of said bluetooth charging signal;
  - an extension rod that is adapted to connect said rod emitter in different vertical or horizontal vantage points on a ceiling to suspend said rod emitter in an overhead vantage point.
- a light indicator that is adapted to indicate functionality of said rod emitter; and
- one or more ventilation slots that are adapted to prevent said rod emitter from overheating;
- a bluetooth charging USB plug-in device that is adapted to couple with said one or more personal digital assistant, wherein said bluetooth charging USB plug-in device comprises:
  - a USB that is adapted to connect said bluetooth charging USB plug-in device to said one or more personal digital assistant;
  - a function button that is adapted to turn said bluetooth charging USB plug-in device ON or OFF;
  - a USB charging port that is adapted to charge said bluetooth charging USB plug-in device; and
  - a velcro that is adapted to couple said bluetooth charging USB plug-in device to said one or more personal digital assistant; and
- a motherboard, wherein said motherboard comprises:
  - a protocol chip that is configured to oversee daily administration of said bluetooth charging USB plug-in device and all protocol system operations;
  - an interface chip that is configured to administrate program codes that allow said Bluetooth charging outlet device to communicate with said bluetooth charging USB plug-in device ;
  - a bluetooth charging chip is configured to activate said bluetooth coil that receives said Bluetooth charging signal from said (i) wall emitter, (ii) rod emitter or (iii) pad emitter; and
  - an update space is adapted to allow up-gradation of said bluetooth charging USB plug-in device with new integration technology;
- a processor that comprises a database, and a set of modules, wherein said processor executes said set of modules, wherein said set of module comprises:
  - an input program module, executed by said processor, that is configured to receive an input from said bluetooth charging USB plug-in device, wherein said input is a plurality of advertisements from said database;
  - an advertisement program module, executed by said processor that is configured to advertise said advertisement on said one or more personal digital assistant;
  - a display program module, executed by said processor that is configured to display said advertisement on said one or more personal digital assistant.

* * * * *